United States Patent [19]
Allsop et al.

[11] Patent Number: 5,970,472
[45] Date of Patent: Oct. 19, 1999

[54] PERFORMING ELECTRONIC COMMERCE ON THE INTERNET PROVIDING LINKS FROM PRODUCT MANUFACTURERS TO AUTHORIZED DEALERS WHERE THE AUTHORIZED DEALER PROVIDES A CUSTOM ORDER INTERFACE FOR THE MANUFACTURER'S PRODUCTS

[75] Inventors: Brett Allsop, Palo Alto; Robin Smith, Mill Valley; Amir H. Taghinia, Hayward; Sameer K. Shamsuddin; James W. Morris, both of San Francisco, all of Calif.

[73] Assignee: Fogdog Sports, San Jose, Calif.

[21] Appl. No.: 08/855,109

[22] Filed: May 13, 1997

[51] Int. Cl.⁶ .................................................. G06F 17/60
[52] U.S. Cl. .............................................. 705/26; 705/27
[58] Field of Search ........................................ 705/26, 27

[56] References Cited

U.S. PATENT DOCUMENTS

| | | | |
|---|---|---|---|
| 5,694,551 | 12/1997 | Doyle et al. | 705/26 |
| 5,799,289 | 8/1998 | Fukushima et al. | 705/1 |
| 5,895,454 | 4/1999 | Harrington | 705/26 |
| 5,897,622 | 4/1999 | Blinn et al. | 705/26 |

OTHER PUBLICATIONS

"Charles River Media" Homepage. www.charlesriver.com. pp. 1–8, 1996.
"Charles River Media Releases CD Helpdesk Series" PR Newswire. Retrieved from DIALOG file 613, record 0899806, Jan. 1996.
"PR Newswire Web Site Directory for Jan. 10,". PR Newswire. Retrieved from DIALOG file 613, record 0900553, Jan. 1996.
"The Javascript Cookbook CD. Now available from Charles River Media." PR Newswire, p. 723LATU032. Retrieved from DIALOG file 148, record 08822035, Jul. 1996.
"Intellicom Operates ISDN Info Center on New Microsoft Network." ISDN News, vol. 8 , n. 19, Sep. 1995.
"SPARCO" Homepage. www.sparco.com. pp. 1–2, 1993.
"Adobe" Homepage. www.adobe.com/purchase/main.html. pp. 1–3, 1998.
"New Issues—Netscape Communications." S&P's Emerging & Special Situations. vol. 15, n. 7, Jul. 1995.
"Cybercash WorldWide Web Site Information", http://www.cybercash.com/cybercash/merchants, downloaded on Mar. 26, 1997, 29 pages.
"Verifone WorldWide Web Site Information", http://www.verifone.com, downloaded on Mar. 26 1997, 9 pages.

*Primary Examiner*—Allen R. MacDonald
*Assistant Examiner*—Michele Stuckey Crecca
*Attorney, Agent, or Firm*—Blakely, Sokoloff, Taylor & Zafman LLP

[57] ABSTRACT

A method is described of providing dealer authorization information to a remote processing system. A local processing system receives information from a manufacturer for updating a database of authorized dealers. The local processing system then receives a validation request from the remote processing system via a network. In response to receiving the validation request, the local processing system queries the database and transmits information to the remote processing system, including an indication of whether a particular dealer is an authorized dealer for one or more manufacturers. The validation request is generated in response to the remote processing system's having identified a predetermined HTML tag in a dealer World Wide Web page. Capability to recognize the tag and transmit a validation request in response thereto is provided by a Web browser plug-in downloaded to the remote processing system. The local processing system may also include a number of order processing units for electronic commerce. Each order processing unit is customized for a specific manufacturer and a specific dealer and provides a customized user interface for ordering products only from the one specific manufacturer and dealer. A customer using a remote processing system accesses an order processing unit by first accessing a manufacturer Web site, which provides a hypertext link to one of the processing units.

28 Claims, 9 Drawing Sheets

PERFORMING ELECTRONIC COMMERCE ON THE INTERNET PROVIDING LINKS FROM PRODUCT MANUFACTURERS TO AUTHORIZED DEALERS WHERE THE AUTHORIZED DEALER PROVIDES A CUSTOM ORDER INTERFACE FOR THE MANUFACTURER'S PRODUCTS

FIELD OF THE INVENTION

The present invention pertains to the Internet. More particularly, the present invention relates to electronic commerce on the Internet.

BACKGROUND OF THE INVENTION

The Internet has developed into a convenient medium by which consumers can purchase goods and services. The ability to purchase goods over the Internet is sometimes provided by software applications known as a "shopping baskets". A shopping basket application, which commonly executes on a World Wide Web site of a product manufacturer or retailer, generally provides a virtual store in which a customer can view descriptions of and purchase various products electronically. A shopping basket application generally allows a customer to add products to or delete products from a virtual shopping basket and specify various attributes, such as quantity, size, color, etc. The customer's selections are generally stored in a database associated with the Web site. When the customer is ready to purchase the contents of the shopping basket, he may click on a hypertext link labeled "Purchase Shopping Basket", for example, which causes the customer to be prompted to enter billing information (i.e., name, address, and credit card number) and to confirm the transaction.

Unfortunately, while the Internet makes electronic commerce convenient, it also provides a medium for perpetrating fraud and other illegal or unethical activities in connection with electronic commerce. In particular, the anonymity of the Internet provides a relatively safe medium for the sellers of gray market goods. It is also not uncommon for the unscrupulous to sell brand name goods through Web sites that are not authorized to sell such goods. A manufacturer may provide a list of authorized dealers (i.e., retailers, or product fulfillers) to the public, by which a customer can theoretically verify that a dealer is authorized to sell a given brand. However, it is inconvenient for the consumer to have to obtain this information, and many manufacturers do not provide such information. Further, because Web sites can be set up with relative ease, an unauthorized site can be set up which is virtually indistinguishable from that of an authorized dealer. Hence, consumers who purchase products on-line take the risk that the products may be counterfeit or may not be backed by a warranty. Manufacturers, on the other hand, have little or no ability to detect or prevent unauthorized on-line sales of their products and other unauthorized on-line use of their brand names.

Hence, it is desirable to provide a technique by which consumers visiting a dealer Web site have greater assurance that the Web site is that of an authorized dealer. In addition, it is desirable to provide a technique by which manufacturers have greater control over the on-line sales of their products, whereby manufacturers can set standards for their dealers and conveniently inform consumers whether a Web site belongs to a dealer which meets those standards.

Manufacturers who wish to promote on-line sales of their products must decide whether or not to handle such sales themselves. For various reasons, it may be undesirable for a manufacturer to make direct sales over the Internet. Direct sales by the manufacturer may be precluded by distribution agreements, or the manufacturer simply may not be equipped to process and fulfill product orders. As an alternative to direct sales, therefore, a manufacturer may wish to refer potential customers to an authorized dealer by providing a link on its own Web site to a Web site of the authorized dealer One problem with this approach, from a manufacturer's point of view, is that a dealer's Web site generally also displays and allows customers to purchase products of competing brands. In addition, the manufacturer often is not informed immediately of a sale by the dealer, making it difficult for the manufacturer to maintain current records.

Therefore, in addition to the above-mentioned capabilities, it is desirable to provide a technique by which a manufacturer can refer a potential on-line customer to an authorized dealer for on-line sales, without exposing the customer to competing product information.

SUMMARY OF THE INVENTION

One aspect of the present invention is a method in a local processing system of providing business authorization information to a remote processing system. In the method, a validation request is received from the remote processing system via a network. The validation request has been transmitted by the remote processing system in response to the remote processing system having detected predetermined content in a World Wide Web page of a first business entity. A database is then accessed by the local processing system based on the validation request. Information is then transmitted to the remote processing system via the network based on results of accessing the database. This information includes an indication of the presence or absence of a business relationship between the first business entity and a second business entity. In one embodiment, the first and second business entities are a product manufacturer and a product dealer, and the business relationship corresponds to whether or not the dealer is an authorized dealer of the manufacturer's products.

Another aspect of the present invention is a method in a client processing system of obtaining business authorization information. In the method, a hypertext document is received from a first remote processing system that is associated with a first business entity. The hypertext document includes a predetermined tag. The predetermined tag is recognized in the hypertext document, and in response, a validation request is transmitted to a second remote processing system. In response to the validation request, the client processing system receives information indicating the presence or absence of a business relationship between the first business entity and a second business entity.

Yet another aspect of the present invention is a method of enabling electronic commerce over a network. In the method, an order processing unit which corresponds to a single brand and a single authorized dealer for products of the brand is maintained. The processing unit is for receiving and processing orders for products of the brand. The processing unit is accessed by a user via the network by selecting a hypertext link that is received from a remote processing system.

Still another aspect of the present invention is a method of performing electronic commerce in a server processing system, in which a remote client processing system is provided with information for enabling the remote client processing system to generate an electronic commerce user interface. Purchase information is received from the remote client processing system with regard to a selected product or service. Information representing a completed transaction is then transmitted over a network to the remote processing system of a provider of the selected product or service.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for performing electronic commerce on the Internet are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

One aspect of the present invention includes a technique by which information indicating whether a dealer is authorized for one or more manufacturers is automatically provided to a consumer's computer when the consumer accesses the dealer's World Wide Web site. Another aspect of the present invention includes a technique by which a consumer can visit a manufacturer's Web site and receive a hypertext link to a customized order processing unit for an authorized dealer of that manufacturer. The customized order processing unit then provides a shopping basket user interface without displaying competing product information to the consumer. Another aspect of the present invention allows a manufacturer to complete an on-line sale of a product from its Web site without having to actually fulfill the product order. These and other aspects of the present invention will be described below in greater detail.

In one embodiment, the present invention is carried out in a computer system by a central processing unit (CPU) executing sequences of instructions contained in a memory. More specifically, execution of the sequences of instructions causes the CPU to perform steps of the present invention, which are described below. The instructions may be loaded into a random access memory (RAM) for execution by the CPU from a read-only memory (ROM), a mass storage device, or some other persistent store. In addition, the instructions may be received by the computer system (the "target" computer system) via a network from another computer system (a "host" computer system). In other embodiments, hardwired circuitry may be used in place of, or in combination with, software instructions to implement the present invention. Thus, the present invention is not limited to any specific combination of hardware circuitry and software, nor to any particular source for the instructions executed by the computer system.

Figure 1:
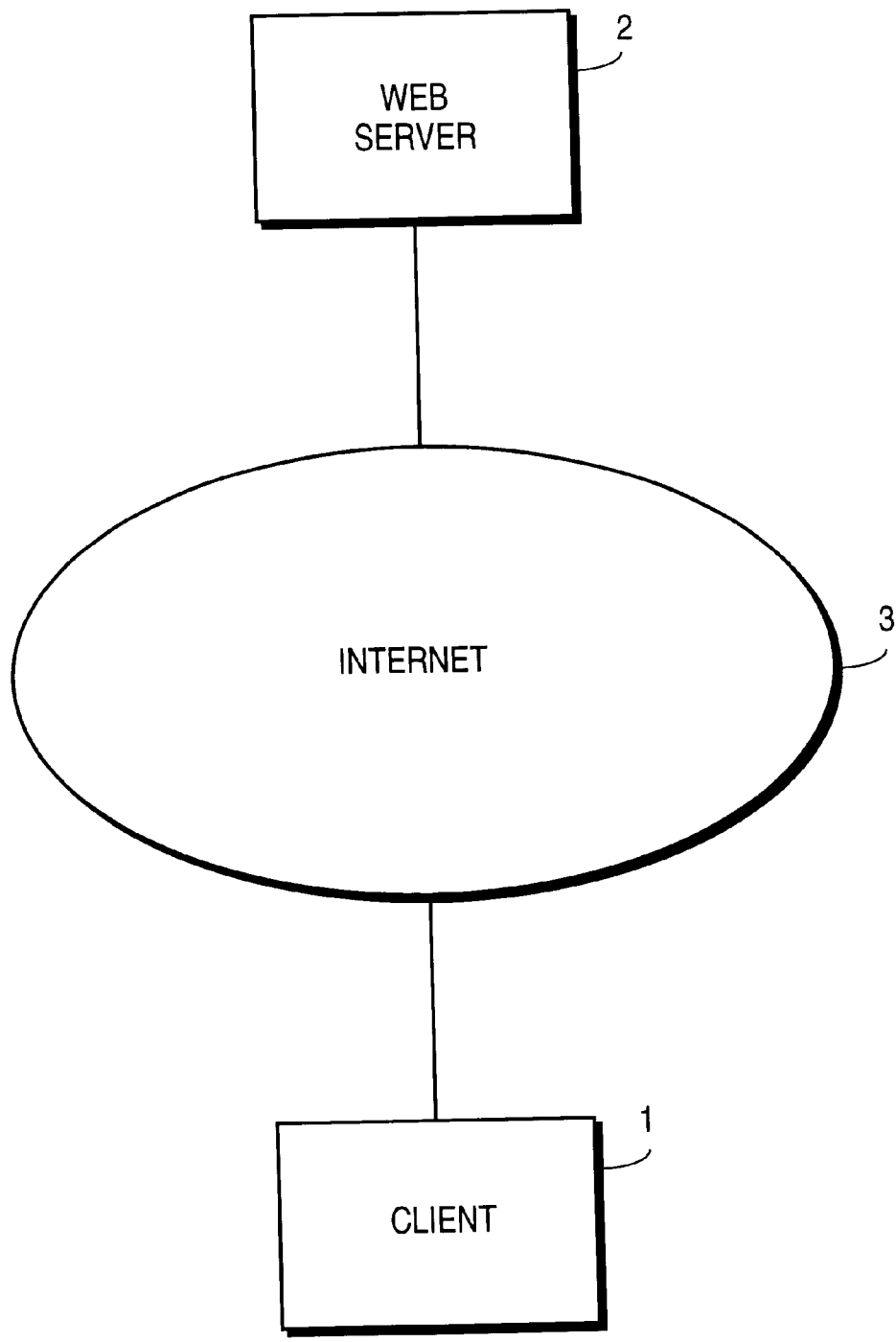
FIG. 1 illustrates a client computer system connected to a World Wide Web server via the Internet.

FIG. 1 illustrates a connection between a client computer system 1 and a Web server computer system 2 implemented via the Internet 3. In general, the client computer system 1 includes and executes a Web browser software application, which allows the client system 1 to access Hypertext Markup Language (HTML) Web pages and other data on various Web servers, such as Web server 2. The user of the client system 1 may be a consumer wishing to purchase products from a given product manufacturer or dealer. Consequently, Web server 2 may include a shopping basket software application for allowing the user to purchase products on-line, or the server 2 may provide a hypertext link to another server which executes such software.

Figure 2:
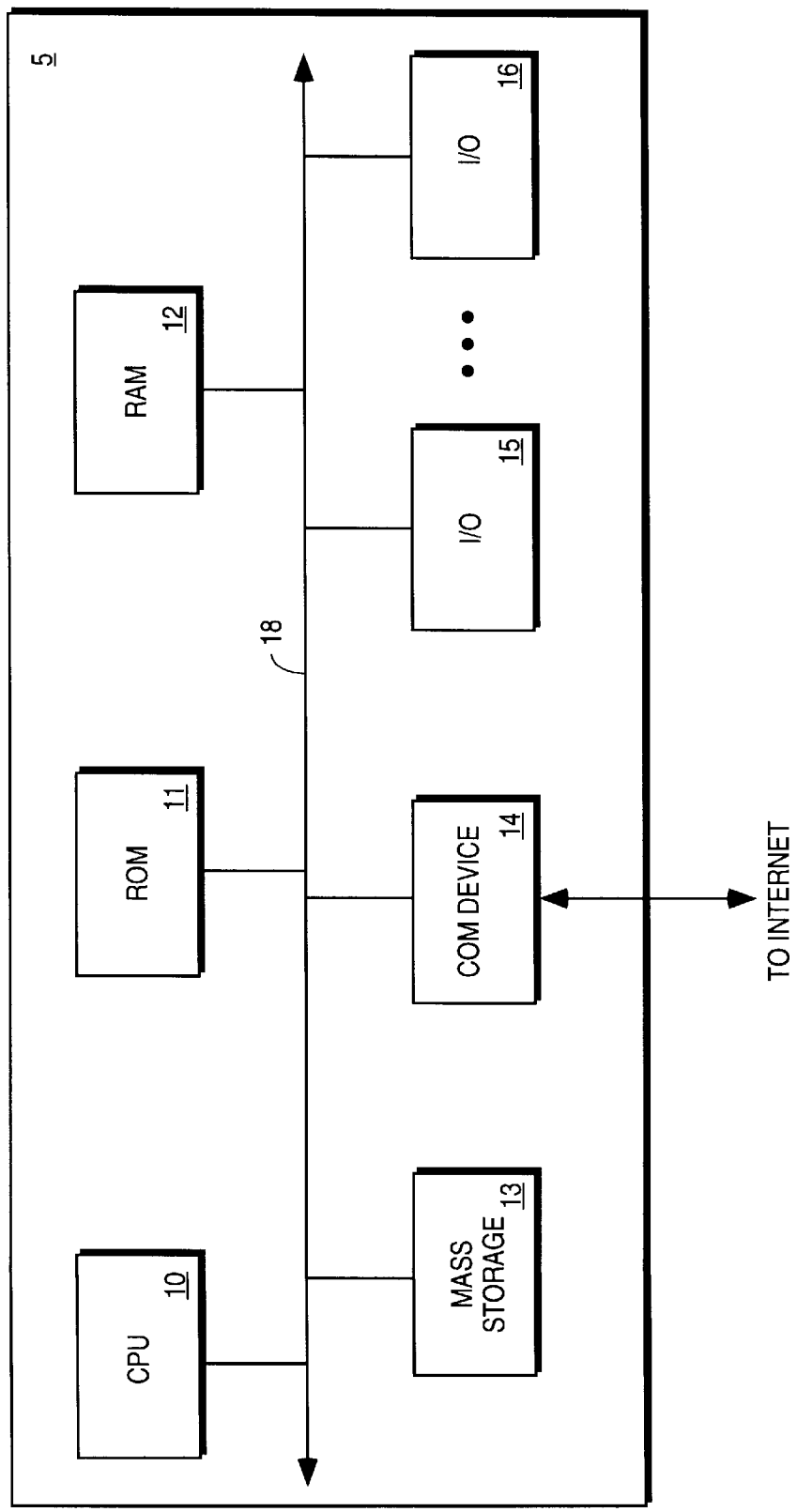
FIG. 2 is a block diagram of a computer system.

FIG. 2 illustrates an example of a computer system which may be used to implement aspects of the present invention. Note that a number of computer systems are referred to in this description, any of which may have the architecture illustrated in FIG. 2 or a similar architecture. The computer system 5 illustrated in FIG. 2, which may be a conventional personal computer (PC), includes a CPU 10, ROM 11, RAM 12 and a mass storage device 13, each coupled to a bus 18. Note that the bus 18 may actually comprise multiple physical buses interconnected by various bridges, adapters, and/or controllers. Also coupled to the bus 18 are a communication device 14 and various input/output (I/O) devices 15 and 16. The mass storage device 13 includes any non-volatile storage facility suitable for storing large volumes of data, such as a magnetic disk or tape; an optical storage device, such as CD-ROM, CD-R, DVD (Digital Versatile Disk); a magneto-optical (MO) storage device, or any other suitable device. Communication device 14 provides the computer system 5 with a connection to the Internet and may be any device suitable for such purpose, such as a conventional telephone modem or an Integrated Services Digital Network (ISDN) adapter. I/O devices 15 and 16 may includes devices, such as monitors, keyboards, pointing devices, printers, etc.

I. Dealer Validation

Figure 3:
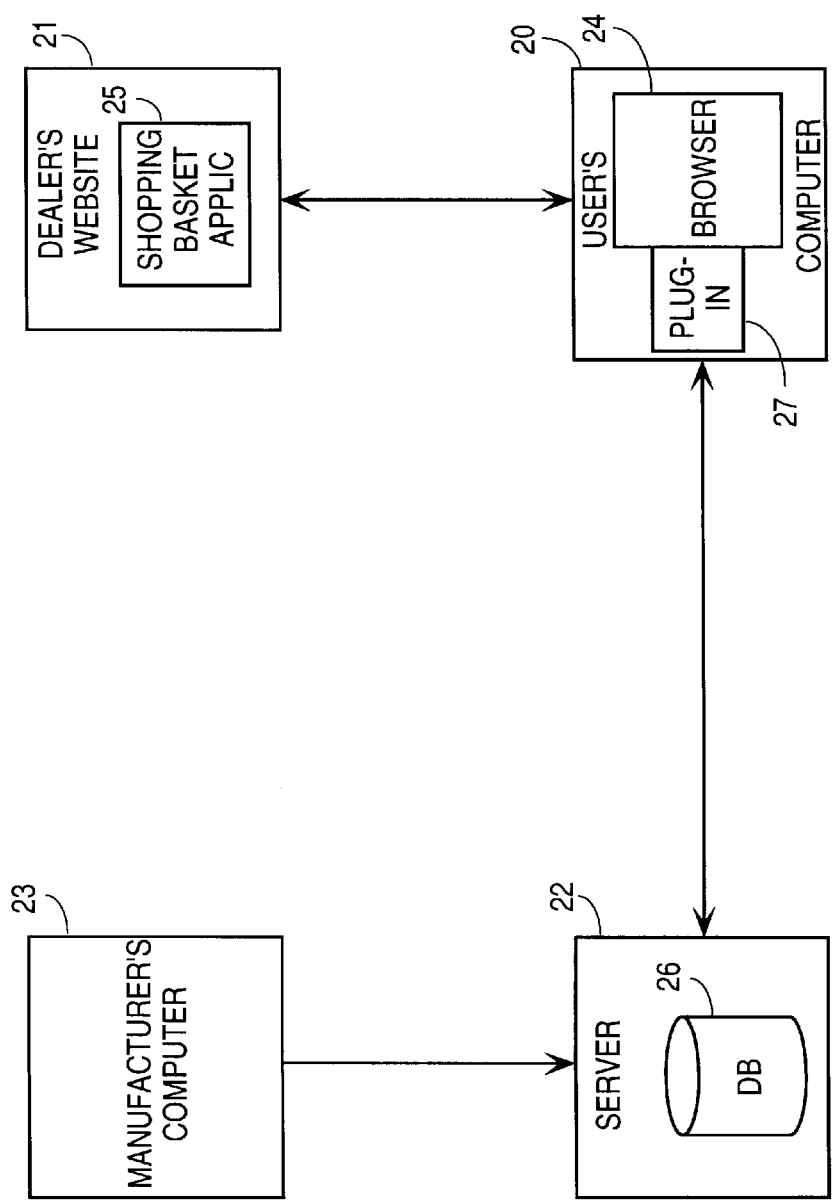
FIG. 3 illustrates the data flow by which business authorization information is automatically provided to a user's computer upon accessing a product dealer's Web site.

Referring now to FIG. 3, assume that a consumer ("the user") wishes to purchase a product on-line from a particular dealer's Web site 21. The user's computer 20 is a Web client which includes conventional Web browser software 24. The dealer's Web site 21 is implemented on a Web server that, in one embodiment, includes a shopping basket application 25 of the type described above. It should be noted, however, that the present technique for identifying authorized dealers does not require the presence of a shopping basket application on the dealer's Web site 21. It is desirable for the user to have some assurance that the dealer operating Web site 21 is authorized to sell the brand name of whichever manufacturer in which the user is interested. Conversely, it is desirable for a manufacturer to have the ability to inform potential customers whether the dealer operating Web site 21 is an authorized dealer for that manufacturer. Consequently, the present invention includes a technique for automatically providing the user with this information when the user accesses the dealer's Web site 21.

In accordance with the present invention, another server computer system 22 is maintained, which has a connection to the Internet and which includes a database 26. The database 26 is used to store a list of authorized dealers for each of one or more manufacturers. In one embodiment, the database 26 is updated over the Internet automatically by the manufacturers.

For example, a manufacturer's computer 23 may send a message over the Internet to the server 22 to cause the server 22 to update the list of authorized dealers for that manufacturer. However, updates to the authorized dealer database 26 can be carried out in other ways within the scope of the present invention, such as by manual data entry. Manufacturers may update their list of authorized dealers in the database 26 periodically or whenever they wish.

The database 26 is accessed automatically in response to the user's computer 20 recognizing a predetermined tag in an HTML document provided by the dealer's Web site 21. For example, the tag may be provided by the shopping basket application 25. In that case, one suitable HTML document in which the tag may be included is, for example, a document for displaying a page of product descriptions. Note that the present invention is not limited to use with HTML, however; other languages may be substituted within the scope of the present invention. When the HTML document is downloaded to the user's computer 20 by the browser 24, the HTML tag is recognized by the browser. The HTML tag includes an identification of the dealer. Hence, any dealer who wishes to sell products on-line may include such an HTML tag in their shopping basket Web site.

In response to recognizing the tag, the browser 24 automatically causes a validation request to be transmitted over the Internet to the server 22.

Hence, the presence of the predetermined tag in the HTML page provided by the dealer's shopping basked application 25 effectively functions as a request by the dealer to be validated. The validation request includes the name of the dealer maintaining the Web site 21. In response to receiving the validation request, the server 22 queries the database 26 with the name of the dealer provided in the validation request and returns to the user's computer 20 a list of the manufacturers for which the dealer is authorized. Alternatively, the server 22 may return a simple yes/no response indicating whether the dealer is authorized for a given manufacturer, which may be specified in the validation request. Upon receiving this response from the server 22, the browser 24 causes the user's computer 20 to display an indication of whether the dealer is authorized, which may be in the form of the names of the manufacturers for which the dealer operating Web site 21 is authorized. In one embodiment, this indication is displayed in a window that is opened up over the standard browser display. However, various other methods may be used to convey this information to the user, such as a change in the user interface features to indicate whether the dealer is authorized, or a direct modification of the currently displayed HTML page.

The ability of the browser 24 to recognize the predetermined HTML tag, to respond by sending a validation request to the server 22, and to cause the user's computer 20 to display authorization information, is provided in one embodiment by the addition of a plug-in 27 to the browser 24. The plug-in 27 is downloaded over the Internet to the user's computer 20 (the "target" computer) prior to the user's accessing the dealer's Web site 21 to purchase products on-line. The plug-in may be provided by, and downloaded from, the manufacturer's Web site 23, the dealer's Web site 21, server 22, or any other suitable computer (the "host" computer) on the Internet.

Figure 4:
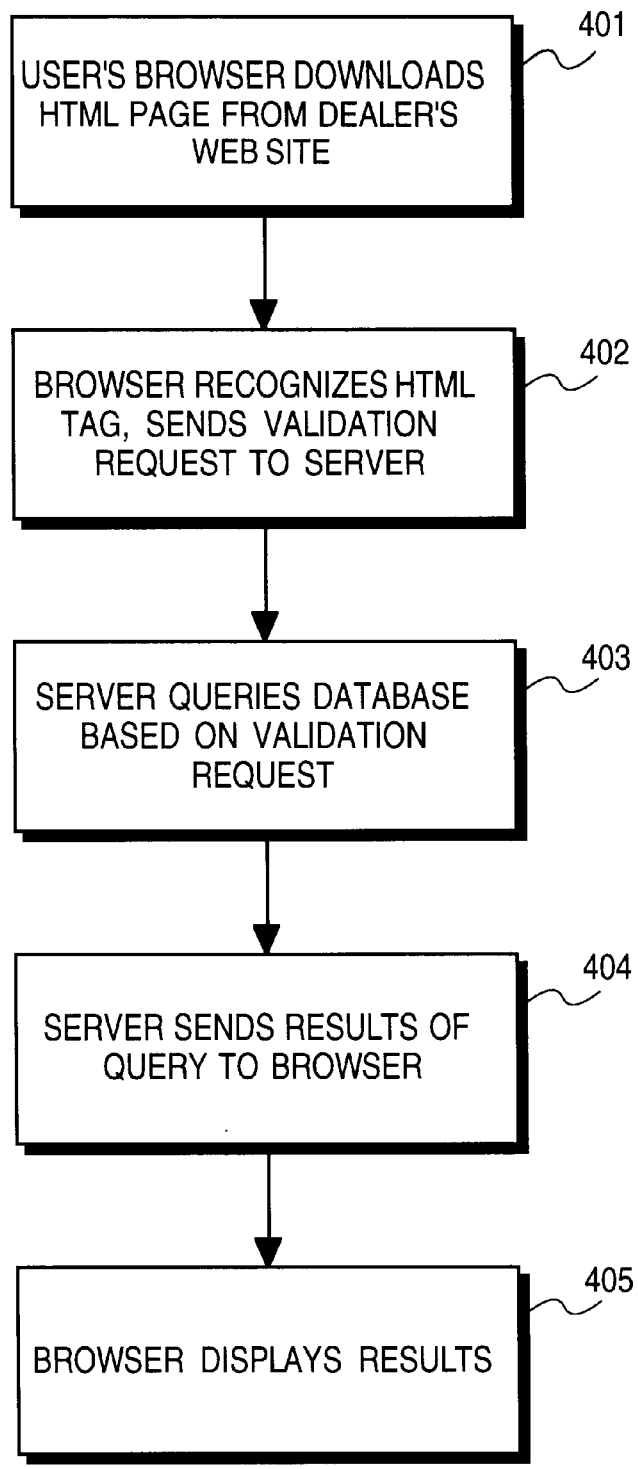
FIG. 4 is a flow diagram illustrating a routine by which business authorization information is provided to a user's computer.

FIG. 4 illustrates a routine by which authorization information is automatically provided to the user's computer 20, as described above. In step 401, the browser 24 downloads an HTML page from the dealer's Web site 21 after invoking the shopping basket application 25. Next, in step 402 the browser recognizes the predetermined HTML tag in the HTML page and responds by sending a validation request to the server 22 over the Internet. In step 403, based on the received validation request, which includes information identifying the dealer maintaining the Web site 21, the server 22 queries the database 26. Upon receiving the results of the query, the server 22 sends the results to the user's computer 20. In response, the browser 24 causes the results to be displayed to the user in step 405. Again, the results may be in the form of a list of manufacturers for which the dealer is authorized or a yes/no response indicating whether the dealer is authorized for a given manufacturer, for example. Thus, the user is automatically notified of whether the dealer whose Web site he is visiting is authorized to sell a given brand.

II. Order Processing

One problem for manufacturers who wish to promote on-line sales of their products is that many such manufacturers do not wish to make direct sales from their own Web sites. However, manufacturers also do not wish to refer customers to dealer Web sites if the customers will be exposed to competing product information. Consequently, the present invention includes a technique for overcoming this problem. The present invention establishes an entity known as a Web Linked Dealer (WLD). A WLD is a dealer which is authorized to sell products of a given manufacturer and which has an on-line shopping Web site that is accessible from the manufacturer's Web site, as will now be described.

Figure 5:
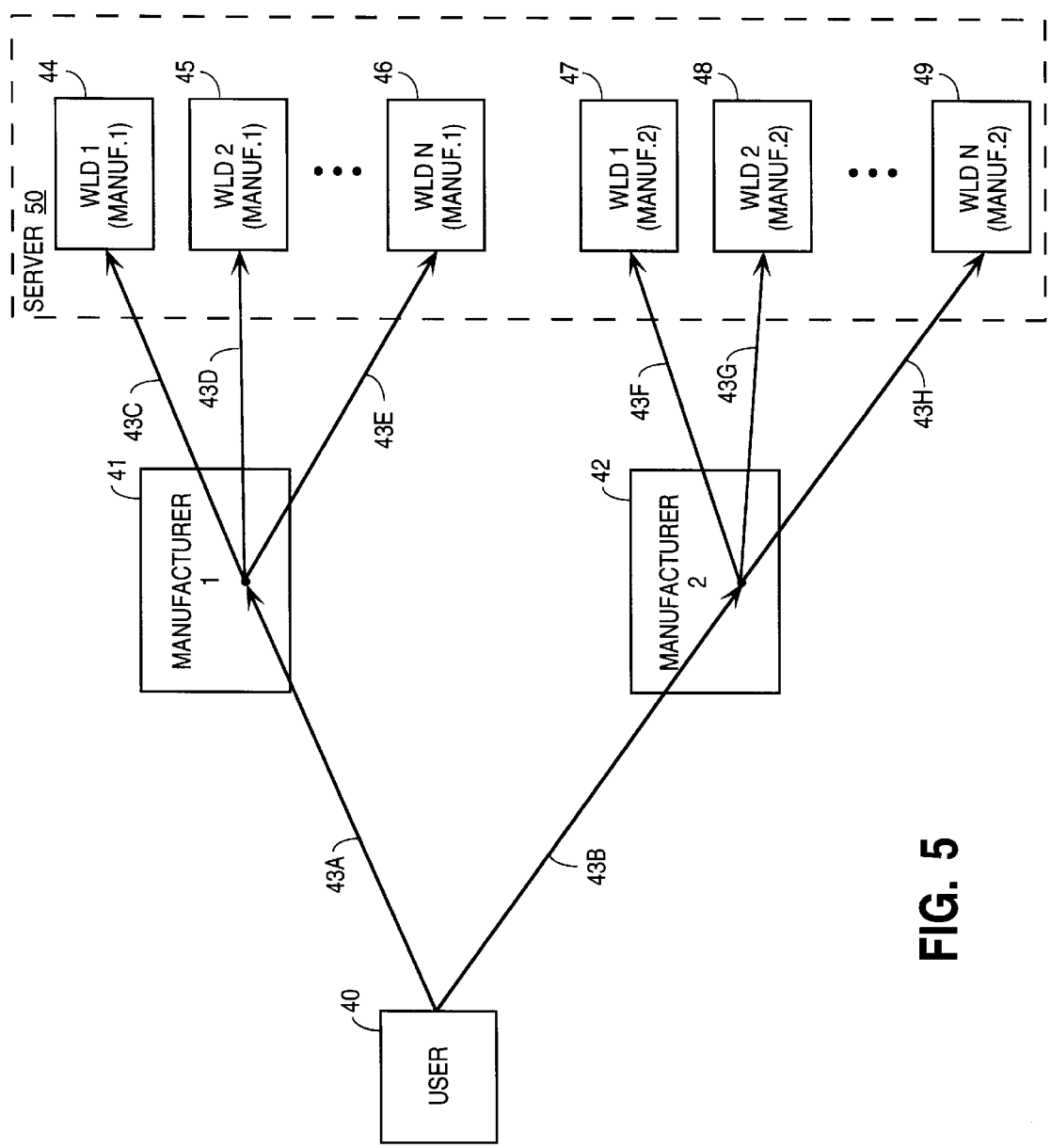
FIG. 5 illustrates two product manufacturer Web sites which provide hypertext links to order processing units of a number of Web Linked Dealers.

Referring now to FIG. 5, assume that two competing brands (i.e., manufacturers) of a product, Manufacturer 1 and Manufacturer 2, maintain Web sites 41 and 42, respectively. A user operates a computer 40 to access either of Web sites 41 or 42 via the Internet using hypertext links 43a and 43b.

Assume further that a number N of dealers are each separately authorized by Manufacturer 1 and Manufacturer 2 to sell products of both Manufacturer 1 and Manufacturer 2 on-line. Accordingly, each of the N dealers is established as a WLD, i.e., WLD 1, WLD 2, ... WLD N, in the manner which will now be described.

A server computer system 50 is maintained with an Internet connection. A number of order processing units 44–49 for processing product orders are maintained and operated on the server 50. The purpose of each of the order processing units 44–49 is to provide an electronic commerce interface by which a user can, through a particular WLD, purchase products of one particular manufacturer that has authorized the WLD, without exposing the user to competing product information. Each order processing unit also includes functional modules which enable either the manufacturer or the corresponding WLD to access, at any time, detailed information on all sales to-date and receive standardized reports of such information. (Despite the similar nomenclature, the "order processing units" 44–49 of the present invention should not be confused with the "central processing unit" of a computer system.)

Each of the order processing units 44–49 includes a shopping basket application and other components, as will be described below. In general, a separate, customized order processing unit is maintained for each WLD for every manufacturer (brand) for which the WLD is authorized. Thus, in the example of FIG. 5, the server 50 maintains 2N separate order processing units 44–49 for the N WLDs, i.e., N order processing units 44–46 associated with Manufacturer 1, and N order processing units 47–49 associated with Manufacturer 2.

The order processing units 44–49 are maintained and operated on one server system 50 in the embodiment shown in FIG. 5. However, in other embodiments, any of the order processing units 44–49 may be maintained on any other Internet server. Such distribution of order processing units is possible, because an order processing unit is accessed and invoked via a hypertext link provided from a manufacturer's Web site, as will now be described.

A consumer accesses an order processing unit by activating a hypertext link provided by the manufacturer's Web site. The URL (Uniform Resource Locator) associated with the hypertext link includes a call to the appropriate order processing unit and, thus, essentially includes information which identifies both the manufacturer and the selected WLD of that manufacturer. A separate hypertext link is provided on each manufacturer's Web site to the order processing unit of each WLD of that manufacturer. Hence, Web site 41 of Manufacturer 1 provides hypertext links 43*c*, 43*d*, and 43*e* to order processing units 44–46, respectively. Similarly, Web site 42 of Manufacturer 2 provides hypertext links 43*f*, 43*g*, and 43*h* to order processing units 47, 48 and 49, respectively. The user, therefore, accesses a particular order processing unit by selecting the hypertext link of a WLD when viewing a page on the manufacturer's Web site.

Hence, a manufacturer can control authorized on-line dealer sales by choosing to have a dealer linked to its Web page only if the dealer meets standards set by the manufacturer. Manufacturer-generated traffic can then be transferred to the dealer for the purpose of on-line sales.

Figure 6:
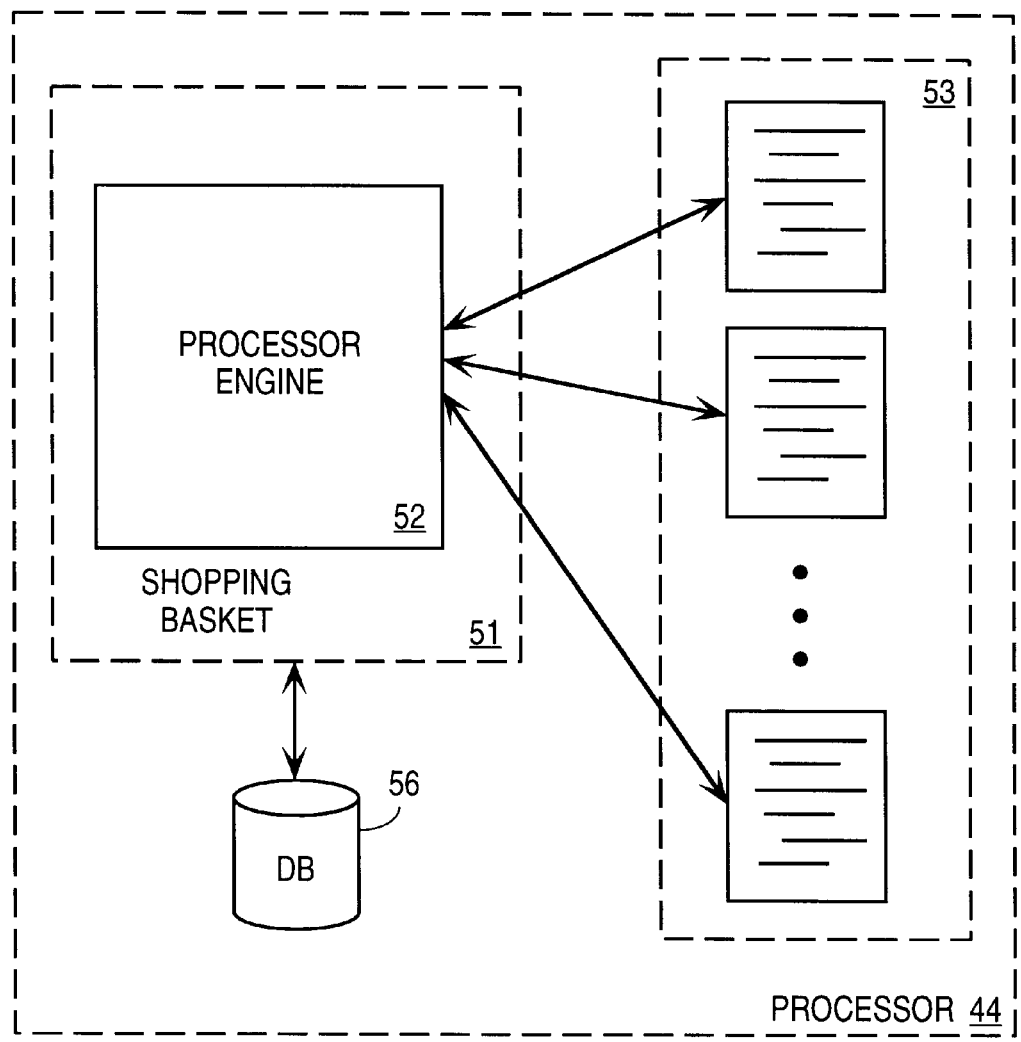
FIG. 6 illustrates an order processing unit for a Web Linked Dealer.

FIG. 6 illustrates an order processing unit 44 of the present invention, which is also representative of each of the other order processing units 45–49. The order processing unit 44 includes a shopping basket application 51 and a set of customized hypertext pages 53 that are designed to display product information relating to one specific WLD (i.e., WLD 1) for one particular manufacturer (i.e., Manufacturer 1). The shopping basket application 51 accesses a database 56, which is used to store various information, such as the current contents of the user's shopping basket and billing information input by the user. As noted above, the order processing unit 44 is invoked from the user's computer 40 when the user selects a hypertext link 43*c* for WLD 1 on a Web page from the Manufacturer 1's Web site.

The shopping basket application 51 includes a processor engine 52, which is responsible for the overall control of the order processing unit 44 and generation of on-line shopping interface. The functions of the processor engine 52 include management of data flow within components of the shopping basket application 51 and other functions, control of state maintenance, maintenance of the shopping basket, and processing of payments, as further described below. In addition, the processor engine 52 retrieves the customized HTML pages 53 in response to user inputs received from the user's computer system 40.

It should be noted that the present invention does not necessarily require a separate shopping basket software application for every order processing unit; a single shopping basket application can be used for all order processing units. However, a separate set of customized Web pages is nonetheless provided for every order processing unit. In that case, a given order processing unit may comprise the combination of the single shopping basket software application with a particular set of HTML pages customized for a particular WLD.

Figure 7:
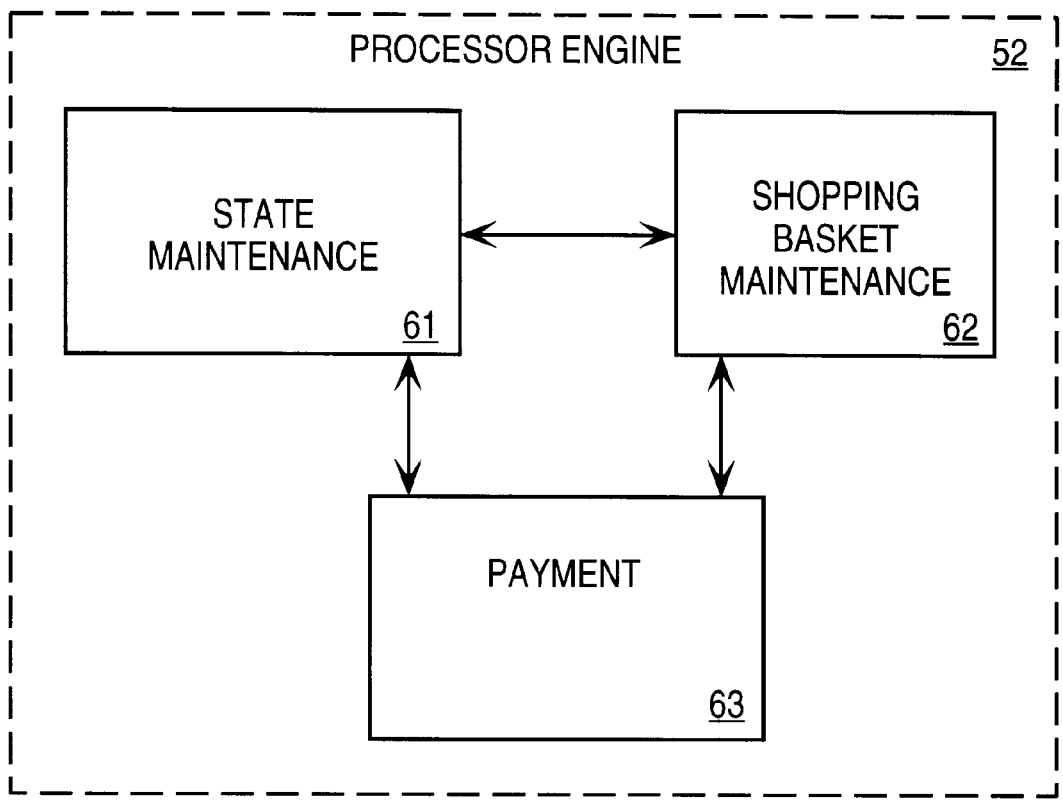
FIG. 7 illustrates a processor engine of an order processing unit.

FIG. 7 illustrates the processor engine 52 in greater detail. The processor engine 52 includes a state maintenance module 61, a shopping basket maintenance module 62, and a payment module 63, all of which are functionally connected to each other. The function of the state maintenance module 61 is to allow various information (e.g., a user identifier) to be dynamically propagated among Web pages to allow the user to maintain a shopping basket. The shopping basket maintenance module 62 provides functions which allow the user to edit the contents of the shopping basket. The payment module 63 handles the monetary aspects of the commerce solution, including acquisition of customer information, calculation of tax and shipping costs, encryption, on-line credit authorization, e-mailing of customer information and encrypted credit card information to a specific company representative, and selection of a WLD. Note that a detailed description of these functional modules is not necessary for an adequate understanding of the present invention and is therefore not provided herein.

Figure 8:
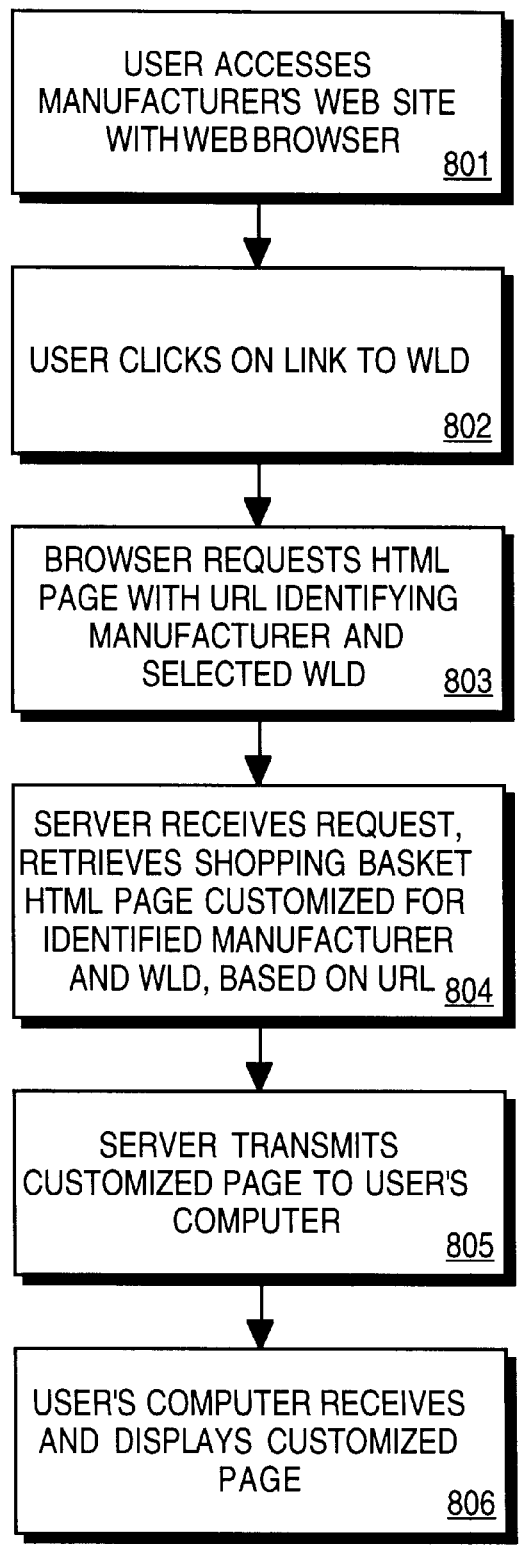
FIG. 8 is a flow diagram illustrating a routine by which the order processing unit of a Web Linked Dealer is accessed via a manufacturer Web site.

FIG. 8 illustrates a routine by which a customized order processing unit of the present invention is invoked and operated. In step 801, the user accesses a manufacturer's Web site. The manufacturer's Web site identifies at least one WLD of that manufacturer. Identities of WLDs may be presented in the form of a displayed list of WLDs for that manufacturer, for example, which may include hypertext links that can be selected by the user. Alternatively, the user may be required to initiate a dealer search to locate the nearest WLD for that manufacturer. For example, a dealer search may be performed by a software module on the manufacturer's Web site that receives the user's zip code as input and then queries a WLD database for WLDs located within a given radius of that zip code's corresponding geographic area. The search may then result in the display of a hypertext link for each WLD returned in the query. Hence, the user then selects one WLD for that manufacturer and clicks on the corresponding hypertext link in step 802.

The URL associated with each such hypertext link includes a call to the corresponding order processing unit in server 50. Therefore, in response to the hypertext link being clicked on, the appropriate order processing unit in the server is invoked. More specifically, in response to the user's clicking on the hypertext link, in step 803 the user's browser requests an HTML page corresponding to the selected link, which page resides on the server 50 as part of a order processing unit. In response, in step 804, the server 50 receives the request and invokes the appropriate order processing unit for the referring manufacturer and the selected WLD. The order processing unit then retrieves the appropriate shopping basket HTML page, which is customized for the referring manufacturer and the selected WLD. The first page retrieved may be, for example, a page welcoming the user to the selected WLDs virtual store.

In step 805, the server 50 transmits the customized HTML page to the user's computer 40. The user's computer 40 then receives the page, and the browser displays the customized page in step 806.

Hence, using the present invention, the manufacturer can set the standards for on-line sales of its products and control on-line sales by choosing to have a dealer linked to its Web page only if the dealer meets those standards. Manufacturer-generated traffic can then be transferred to the dealer for the purpose of on-line sales. The user is able to directly access an authorized dealer for a particular manufacturer from that manufacturer's Web site. The manufacturer is not burdened with having to process or fulfill product orders, and the user is not exposed to competing product information.

It should also be noted that, in other embodiments of the present invention, an order processing unit such as those described above may be accessed from a source other than a manufacturer's Web site. A link to an order processing unit might be provided on any Web site or other source of on-line traffic. In one embodiment, for example, a link to an order processing unit is provided on the home page of a conventional search engine, such as Yahoo, Alta Vista, Lycos, or Excite.

III. Dealer Fulfillment of Manufacturer Direct Sales

It may be desirable for certain manufacturers to process sales directly without having to fulfill product orders (i.e., deliver products to the consumer). The present invention includes a technique which makes this approach possible. In accordance with the present invention, a manufacturer processes a sale to completion on its own Web site. Once the transaction is completed, detailed information on the sale is then transmitted to an appropriate dealer who can fulfill the product order.

Figure 9:
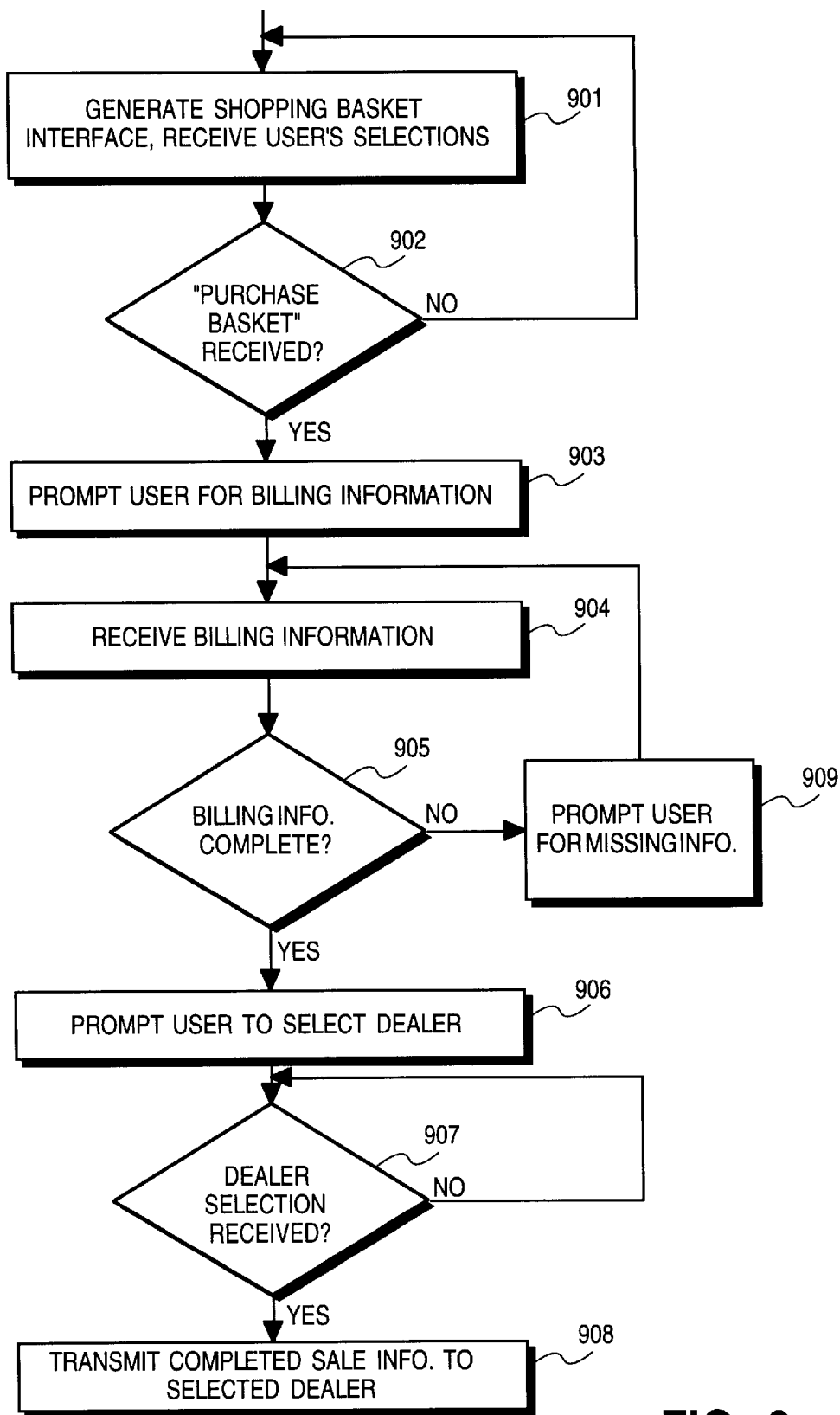
FIG. 9 is a flow diagram illustrating a routine by which completed transaction information is provided from a manufacturer Web site to a selected dealer.

FIG. 9 illustrates a routine for implementing such a technique. The manufacturer's computer is a Web server (Web site) which includes a conventional shopping basket application. In step 901, the manufacturer's Web site executes the shopping basket application to provide the user of a remote computer with a user interface for on-line shopping and receives the user's inputs selecting various products. When an input is received from the user's computer system indicating that the user wishes to purchase the shopping basket (step 902), the manufacturer's computer prompts the user to enter appropriate billing information (i.e., name, address, credit card number, etc.) by transmitting the appropriate HTML pages to the user's computer system in step 903. The user then inputs the requested billing information and causes this information to be transmitted back across the Internet to the manufacturer's Web site. In step 904, the manufacturer's Web computer receives the billing information and determines whether the information is complete. If the billing information is not complete (step 905), then in step 909 the user is prompted to enter any missing information, and the routine repeats from step 904. If the information is complete (step 905), then in step 906 the manufacturer's computer prompts the user to select a dealer from which they wish to take delivery of the product. This prompt may be in the form of a list of dealers, or the user may be required to invoke a dealer search in the manner described above. Once the manufacturer's Web site receives the user's dealer selection (step 907), a complete set of sale information, including the customer's name, address, credit card number, products purchased, etc., is sent to the selected dealer in step 908. In one embodiment, the complete sale information is sent to the selected dealer in the form of an e-mail message. Alternatively, the sale information may be sent as a facsimile transmission over the Internet or standard telephone lines, or in any other suitable manner. Hence, the manufacturer actually processes the order and completes the sale, but does not fulfill the product order.

In one embodiment, the manufacturer's computer system automatically accesses an inventory database to determine if a purchased product is currently in a particular dealer's inventory. The database can be accessed before the dealer has been selected by the user, such that the user is not allowed to select any dealer which does not have the product in stock. Alternatively, the database can be accessed after the user goes off-line, such that in the event that the dealer does not have the product in stock, the product is shipped directly to the customer or to the selected dealer before the customer arrives to take delivery. The inventory database may be maintained on the dealer's Web site.

Thus, a method and apparatus for performing electronic commerce on the Internet have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of enabling electronic commerce over a network, the method comprising:

using a first processing system to maintain an order processing unit corresponding to a single manufacturer and a single authorized dealer for a business of said manufacturer, wherein the single authorized dealer is different from said manufacturer, the order processing unit for receiving and processing orders for said business of only said manufacturer; and receiving a signal for invoking the order processing unit from a remote processing system via a network, the signal having been transmitted from the remote processing system in response to a selection of a hypermedia link; and using the first processing system to operate the order processing unit in response to the signal.

2. A method according to claim 1, wherein the remote processing system provides a network site of a provider of products of said manufacturer and wherein the network site provides the hypermedia link to the order processing unit.

3. A method according to claim 2, wherein the network site is a World Wide Web site of a manufacturer of products of said manufacturer.

4. A method according to claim 1, wherein the hypermedia link comprises information specifying said single dealer.

5. A method according to claim 4, wherein the hypermedia link further comprises information specifying a manufacturer of products of said manufacturer.

6. A method of enabling electronic commerce over a network, the method comprising:

using a first processing system to maintain an order processing unit corresponding to a single manufacturer and a single authorized dealer of products of said manufacturer, wherein the single authorized dealer is separate from said single manufacturer, the order processing unit configured to provide a user interface for enabling a user to submit orders for products of only said single manufacturer and configured to receive and process the orders; and receiving a request for invoking the order processing unit from a remote processing system via a network, the request having been transmitted from the remote processing system in response to a selection of a hypertext link by the user; and using the first processing to operate the order processing unit in response to the request.

7. A method according to claim 6, wherein the network site is a World Wide Web site of a manufacturer of products of said manufacturer.

8. A method according to claim 6, wherein the hypermedia link comprises information specifying said single dealer.

9. A method according to claim 8, wherein the hypermedia link further comprises information specifying a manufacturer of products of said manufacturer.

10. A method of enabling electronic commerce over a network, the method comprising:

receiving a signal from a remote processing system via the network, the signal having been transmitted from the remote processing system in response to a selection of a hypertext link by a user, the hypertext link provided by a World Wide Web site of a manufacturer, the hypertext link specifying an authorized dealer of said manufacturer, wherein the single authorized dealer is different from said manufacturer; and invoking an order processing unit in a local processing system in response to the signal, wherein said invoking includes providing information for generating a user interface for ordering products of only the single manufacturer in association with only said authorized dealer, wherein the order processing unit is configured to receive and process the orders.

11. A method of enabling electronic commerce for a plurality of brands and a plurality of authorized dealers for the brands, the method comprising:

using a first processing system to maintain a plurality of order processing units, each of the order processing units associated with a different combination comprising only one of the brands and only one of the authorized dealers, each of the order processing units configured to provide to a user of a remote processing system product information for the corresponding one of the brands, each of the order processing units further for receiving and processing product orders to be fulfilled by the corresponding one of the authorized dealers;

receiving a signal for invoking one of the order processing units; and using the first processing system to operate said one of the order processing units in response to the request.

12. A method of enabling electronic commerce for a plurality of manufacturers and a plurality of authorized dealers for the manufacturers, the method comprising:

maintaining a plurality of order processing units, each of the order processing units associated with a different combination comprising only one of the manufactures and only one of the authorized dealers, each of the order processing units for generating information to enable a first processing system to output product information for a corresponding one of the manufacturers, each of the order processing units further for receiving and processing product orders to be fulfilled by a corresponding one of the authorized dealers;

receiving a request for invoking one of the order processing units in response to activation of a hypertext link by a user of the first processing system; and using a second processing system to operate said one of the order processing units in response to the request, including:

transmitting to the first processing system information to enable the first processing system to output product information for one of the manufacturers specified by the hypertext link; and receiving information representing an order for a product of said one of the manufacturers from the remote processing system, the order to be fulfilled by a corresponding one of the authorized dealers specified by the hypertext link.

13. In a local processing system, a method of enabling electronic commerce, the method comprising the steps of:

receiving a request from a first remote processing system via a network, the request having been generated by the first remote processing system according to a hypermedia link provided to the first remote processing system from a separate processing system on the network; and in response to receiving the request, transmitting to the first remote processing system over the network, information for enabling the first remote processing system to output an electronic commerce interface to a user, the electronic commerce interface including product information of only a single product manufacturer and information of only one authorized dealer for said product manufacturer, the electronic commerce interface configured to enable the user to input product ordering information for a product of said manufacturer.

14. A method according to claim 13, wherein the request comprises an identification of said only one of the authorized dealers and an identification of said one of the manufacturers.

15. A method according to claim 13, receiving the product ordering information from the first remote processing system.

16. A method according to claim 13, wherein the site on the network comprises a World Wide Web site.

17. A method according to claim 16, wherein the World Wide Web site is a World Wide Web site maintained by single product manufacturer.

18. A processing system comprising:

means for maintaining an order processing unit corresponding to a single manufacturer and a single authorized dealer for a business of said manufacturer, wherein the single authorized dealer is different from said manufacturer, the order processing unit for receiving and processing orders for said business of only said manufacturer; and means for receiving a signal for invoking the order processing unit from a remote processing system via a network, the signal having been transmitted from the remote processing system in response to a selection of a hypermedia link; and means for invoking the order processing unit in response to the signal.

19. A processing system according to claim 18, wherein the remote processing system provides a network site of a provider of products of said manufacturer, and wherein the network site provides the hypermedia link to the order processing unit.

20. A processing system according to claim 19, wherein the network site is a World Wide Web site of a manufacturer of products of said manufacturer.

21. A processing system according to claim 18, wherein the hypermedia link comprises information specifying said single dealer.

22. A processing system according to claim 21, wherein the hypermedia link further comprises information specifying a manufacturer of products of said manufacturer.

23. A processing system comprising:
- a central processing unit (CPU); and
- a storage device coupled to the processor and having stored therein information for configuring the CPU to:
  - maintain an order processing unit corresponding to a single manufacturer and a single authorized dealer of products of said manufacturer, wherein the single authorized dealer is different from said single manufacturer, the order processing unit configured to provide a user interface for enabling a user to submit orders for products of only said single manufacturer and configured to receive and process the orders; and
  - receive a request for invoking the order processing unit from a remote processing system via a network, the request having been transmitted from the remote processing system in response to a selection of a hypertext link by the user; and
  - operate the order processing unit in response to the request.

24. A processing system according to claim 23, wherein the network site is a World Wide Web site of a manufacturer of products of said manufacturer.

25. A processing system according to claim 23, wherein the hypermedia link comprises information specifying said single dealer.

26. A processing system according to claim 23, wherein the hypermedia link further comprises information specifying a manufacturer of products of said manufacturer.

27. An apparatus for enabling electronic commerce over a network, the apparatus comprising:
- means for receiving a signal from a remote processing system via the network, the signal having been transmitted from the remote processing system in response to a selection of a hypertext link by a user, the hypertext link provided by a World Wide Web site of a manufacturer, the hypertext link specifying an authorized dealer of said manufacturer, wherein the single authorized dealer is different from said manufacturer; and
- means for invoking an order processing unit in a local processing system in response to the signal, wherein said invoking includes providing information to for generating a user interface for ordering products of only the single manufacturer in association with only said authorized dealer, wherein the order processing unit is configured to receive and process the orders.

28. A processing system configured to enable electronic commerce for a plurality of manufacturers and a plurality of authorized dealers for the manufacturers, the processing system comprising:
- a plurality of order processing units, each of the order processing units associated with a different combination comprising only one of the manufactures and only one of the authorized dealers, each of the order processing units for generating information to enable a remote processing system to output product information for a corresponding one of the manufacturers, each of the order processing units further for receiving and processing product orders to be fulfilled by a corresponding one of the authorized dealers;
- means for receiving a request for invoking one of the order processing units in response to activation of a hypertext link by a user of the remote processing system; and
- means for operating said one of the order processing units in response to the request, the means for operating including:
  - means for transmitting to the remote processing system information to enable the remote processing system to output product information for one of the manufacturers specified by the hypertext link; and
  - means for receiving information representing an order for a product of said one of the manufacturers from the remote processing system, the order to be fulfilled by a corresponding one of the authorized dealers specified by the hypertext link.

* * * * *